May 2, 1939. L. W. BLAU 2,156,259
SEISMIC-ELECTRIC PROSPECTING BY MEANS OF CONTINUED WAVES
Filed Dec. 22, 1934 5 Sheets-Sheet 1

Ludwig W. Blau Inventor
By W. F. Weigester Attorney

May 2, 1939. L. W. BLAU 2,156,259
SEISMIC-ELECTRIC PROSPECTING BY MEANS OF CONTINUED WAVES
Filed Dec. 22, 1934 5 Sheets-Sheet 2

Ludwig W. Blau Inventor
By W. F. Weigester Attorney

May 2, 1939. L. W. BLAU 2,156,259
SEISMIC-ELECTRIC PROSPECTING BY MEANS OF CONTINUED WAVES
Filed Dec. 22, 1934  5 Sheets-Sheet 3

Ludwig W. Blau Inventor
By W. F. Weiqester Attorney

May 2, 1939.  L. W. BLAU  2,156,259
SEISMIC-ELECTRIC PROSPECTING BY MEANS OF CONTINUED WAVES
Filed Dec. 22, 1934   5 Sheets-Sheet 4

Ludwig W. Blau Inventor
By W. F. Weigester Attorney

May 2, 1939.  L. W. BLAU  2,156,259
SEISMIC-ELECTRIC PROSPECTING BY MEANS OF CONTINUED WAVES
Filed Dec. 22, 1934   5 Sheets-Sheet 5

Ludwig W. Blau Inventor
By W. F. Weigester Attorney

Patented May 2, 1939

2,156,259

UNITED STATES PATENT OFFICE 2,156,259

SEISMIC-ELECTRIC PROSPECTING BY MEANS OF CONTINUED WAVES

Ludwig W. Blau, Houston, Tex., assignor to Standard Oil Development Company, a corporation of Delaware Application December 22, 1934, Serial No. 758,736

10 Claims. (Cl. 181—0.5)

This invention relates to improvements in geophysical prospecting. More particularly, it relates to an improved method and apparatus for seismic-electric prospecting by the use of continued earth vibrations of a given frequency.

In refraction and reflection shooting as employed up to the present time in geophysical prospecting, it is customary to explode a charge of dynamite in the earth resulting in the generation of seismic impulses in the earth and to observe the impulses at distant points after they have been refracted and/or reflected by boundaries between layers having different elasticities and/or densities. The observation has been effected by means of seismographs. This procedure is expensive and is dangerous to the operatives. Also, much of the energy released by the explosion of the dynamite is transmitted in the form of high frequencies which are absorbed by the ground within a short distance from the shot-point. Only the low frequencies are transmitted over long distances from the shot-point. The energy which leaves the shot-point in the form of high frequencies is therefore lost. Also, the surface waves generated by the explosion are very strong. Because of their low frequency and consequent low absorption by the ground their energy content is high, so that the surface waves must be filtered out usually by means of electrical filters.

This application is a continuation-in-part of the co-pending application of Ludwig W. Blau and Louis Statham entitled "Method and apparatus for seismic prospecting", Serial No. 647,084, filed December 14, 1932, now Patent No. 2,046,104, issued June 30, 1936.

In said application there is described and claimed a seismic prospecting method in which the conventional seismograph is replaced by an eletrical circuit which includes a volume of the ground which may be directly included in the circuit or may be included inductively, or may form a condenser with part of the circuit. Whereas, in conventional seismic prospecting the arrival of the seismic waves at the receiving station, or pickup, is indicated by the setting up of a current in the pickup circuit due to an E. M. F. induced into a freely moving coil mounted in a magnetic field in the pickup, said coil being set in motion by the arrival of the seismic waves, arrival of the seismic waves at the receiving station, according to said application, is indicated by the change in the electrical property of the ground which is being utilized. The effect of seismic waves on an electrical property of the ground is known as a seismic-electric effect. One of its embodiments is described as "a temporary variation of the specific electrical conductivity of rocks under the influence of elastic artificially produced deformation of the ground", by A. Belluigi, in his article entitled "Seismic-electric prospecting" on pages 37–42 of the November 29, 1937, issue of the Oil Weekly.

The present invention is directed to an improvement in the general seismic-electric method, claimed in the above referred to application, according to which a generator of periodic impulses of any desired frequency is employed, instead of an explosion, as a source of seismic waves. This substitution eliminates all the disadvantages attending the use of explosives enumerated above and makes possible the additional, very desirable, procedural expedient of setting the electrodes of the receiving circuit a distance apart equal to a whole number of the surface waves generated in the earth by the source.

Other objects and advantages of the present invention will appear from the following detailed description of the accompanying drawings, in which.

Figure 1:
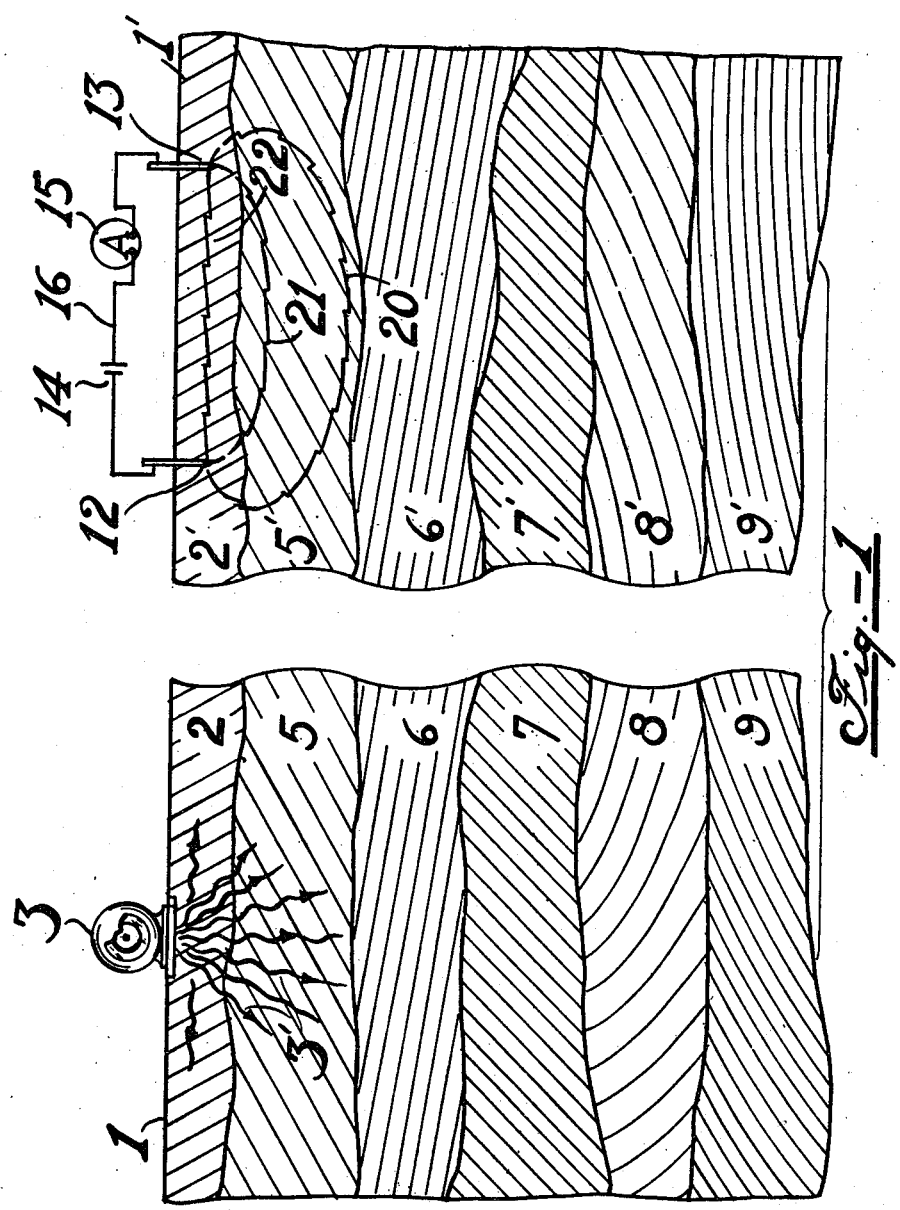
Fig. 1 is a vertical sectional view through the earth strata showing diagrammatically a preferred apparatus for carrying out the invention.
Figure 2:
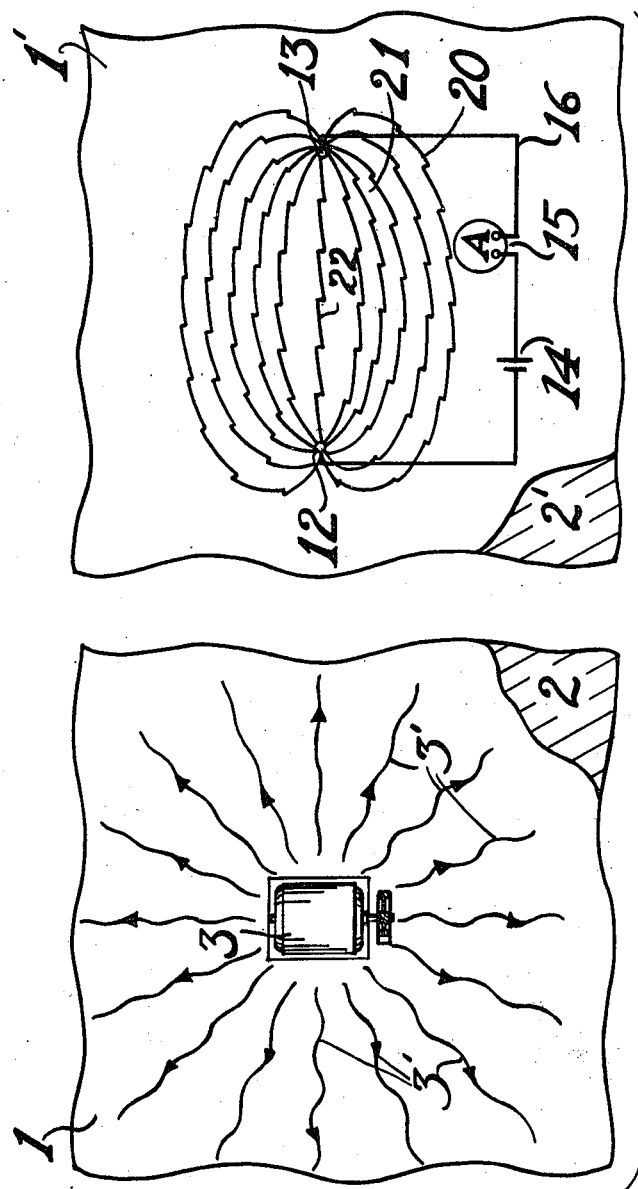
Fig. 2 is a top plan view of the apparatus illustrated in Fig. 1.

Referring particularly to Figs. 1 and 2 of the drawings, reference numerals 1, 1' designate the surface of the earth and 2, 2' designate the low velocity layer near the surface of the earth. Numeral 3 designates a source of continued vibrations 3' such as a motor with a portion of the pulley or coupling removed. The vibrations are of a predetermined frequency and are transmitted into the earth. Any other suitable source of continued vibrations of predetermined frequency can be used, and some of the advantages of the invention will be retained. The source 3 of continued vibrations is adjusted to generate vibrations of relatively low frequency such as approximately five cycles per second. If desired, vibrations of somewhat higher or lower frequencies may be used such as ⅓ to 100 cycles per second, and some of the advantages of the invention will be retained. The elastic waves then travel in all directions from the source 3, but a large part of the energy will be propagated in the low velocity layer 2, 2' because surface waves are naturally of low frequency and because the amplitude of the surface waves decreases inversely with the distance. Some of the waves travel downward and are reflected from lower earth strata designated 5—5', 6—6', 7—7', 8—8' and 9—9'.

Means are provided for receiving seismic electrically over a continuous extended volume of the earth, including sub-surface strata, the wave energy arriving throughout the volume from the source 3 of continued vibrations of given frequency. The means comprises electrodes 12 and 13 which are disposed in the surface stratum 2, 2' in spaced relation to each other and to the source 3 of the earth vibrations. Preferably the electrodes 12 and 13 are disposed in alignment substantially radially with respect to the source 3 of earth vibrations. The electrodes 12 and 13 may be non-polarizing or otherwise and may be driven into the ground. Alternatively, the electrodes may comprise non-polarizing porous cups filled with a salt solution. The electrodes 12 and 13 are connected across a battery 14 through an ammeter 15 by means of electrically conductive line 16. The battery 14 causes a flow of direct current through the ground between the electrodes 12 and 13, thereby producing lines of electric force which approximately parallel the lines 20, 21 and 22. The lines of force designated 22 pass through the surface layer 2, 2' directly between the electrodes 12 and 13 which extend only into the surface layer 2, 2'. The lines of force 20 and 21 extend into the sub-surface stratum 5, 5'. Instead of direct current, alternating current may be used if desired, in which case an alternating current generator is connected in the circuit between the electrodes 12 and 13 in place of the battery 14.

I have found that mechanical vibrations change the electrical resistance of the ground. The arrival of the waves in the vicinity of the electrodes 12 and 13 therefore changes the electrical resistance of the ground around the electrodes and hence changes the current indicated by the ammeter 15. Now, the velocity of surface waves is about 1000 feet per second. If a frequency of five cycles per second is employed at the sending station 3, the wave length will be 200 feet.

If now the electrodes 12 and 13 are separated by a distance of 200' or any multiple thereof, it is apparent that between the electrodes there will be a complete surface wave or a number of complete surface waves. This being the case, the mean deformation of the particles of earth between the electrodes due to surface waves is always the same, since, for every compression of these particles due to one part of the wavelength, there will always be an equal and opposite separation of these particles due to the opposite part of the wavelength.

On the other hand, since the velocities in the earth strata 5, 5' to 9, 9' inclusive below the layer 2, 2' are much higher, running from about 6000' per second below the layer 2, 2' to 15,000' per second at greater depths and since the frequency of the waves passing through the stratum is the same as the frequency of surface waves, the wavelengths of the waves in the lower strata will be much longer than the wave lengths of the surface waves. For this reason and for the further reason that these waves from the lower stratum arrive at the surface between the electrodes in a nearly vertical direction, the electrodes being set to cancel out the effect of the surface wave, it is apparent that there can not be a complete wavelength or a multiple thereof of a wave from the sub-strata between the electrodes at any given time. Consequently, the rearrangement of the particles of earth between the electrodes due to the waves from the sub-strata or the reflected waves will be constantly changing in accordance with the part of the reflected wave which is passing therethrough. It follows that the change in the electrical properties of the earth between the electrodes when they are set to cancel out the effect of the surface wave will be due mainly to the passage therethrough of reflected waves.

Figure 3:
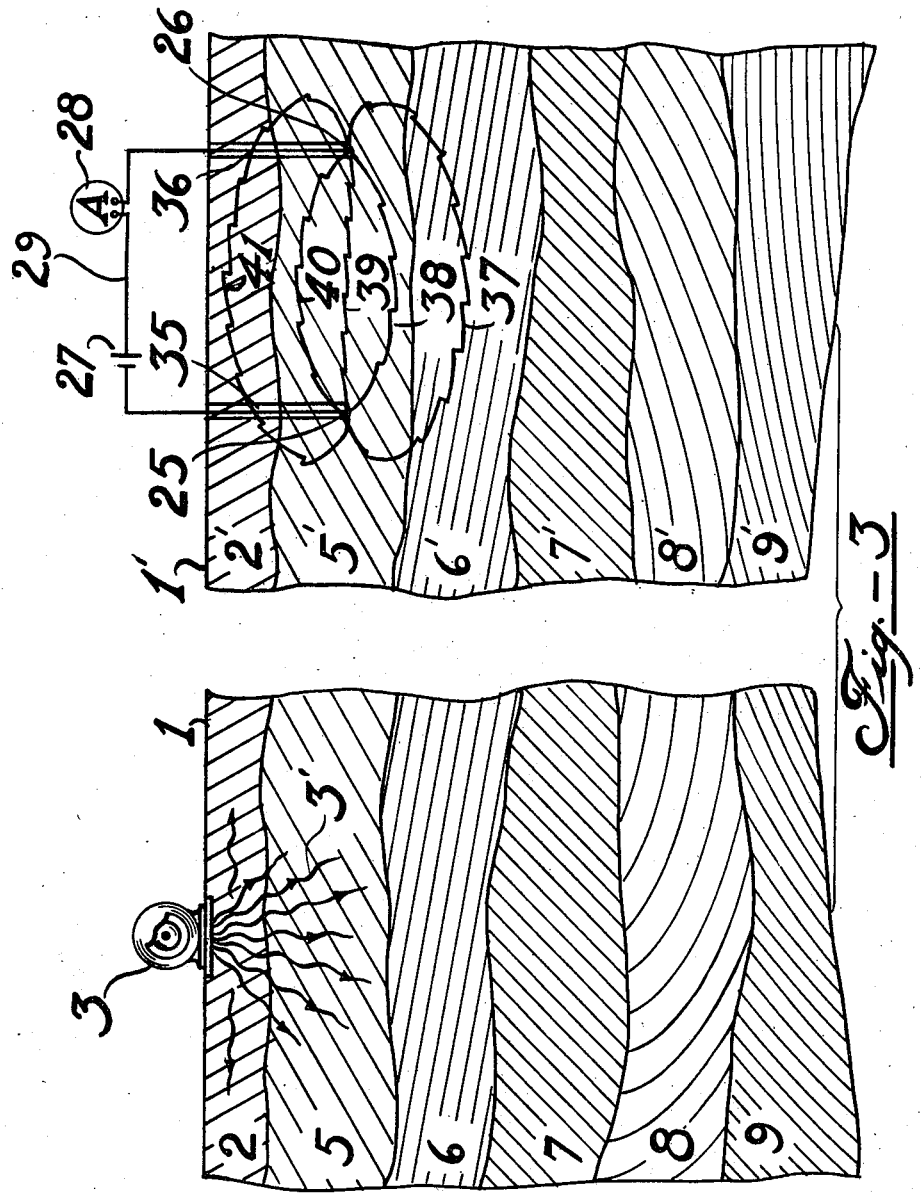
Fig. 3 is a vertical sectional view through the earth strata showing a modified form of apparatus for carrying out the invention.

Referring to Fig. 3, a modified form of the invention is shown in which electrodes 25 and 26 which may be of the same type as electrodes 12 and 13 are disposed in the sub-surface stratum 5, 5'. The electrodes 25 and 26 are therefore placed beneath the low velocity layer 2, 2'. The electrodes 25 and 26 are connected across a battery 27 and ammeter 28 by means of an electrically conductive line 29. In disposing the electrodes 25 and 26 in the sub-surface stratum 5, holes 35 and 36 are drilled through the low velocity layer 2, 2' into the layer 5, 5'. The electrodes, porous cups or otherwise are lowered into these holes and the leads insulated from the ground. Current from the battery 27 or from the generator of alternating current then flows through the lower earth layer 5, 5' with greater intensity than when the arrangement of electrodes illustrated in Fig. 1 is used. The lines of electric force passing between the electrodes flow substantially parallel with the dotted lines designated 37, 38, 39, 40 and 41, their region of greatest intensity being in the stratum 5, 5'. Partial cancellation occurs of some of the earth waves refracted by the shallow sub-surface stratum in addition to the elimination of the surface waves when using the arrangement of apparatus illustrated in Fig. 3. Many of the waves arrive in the region traversed by the electric current in a nearly horizontal direction and these waves are therefore partly eliminated.

Figure 4:
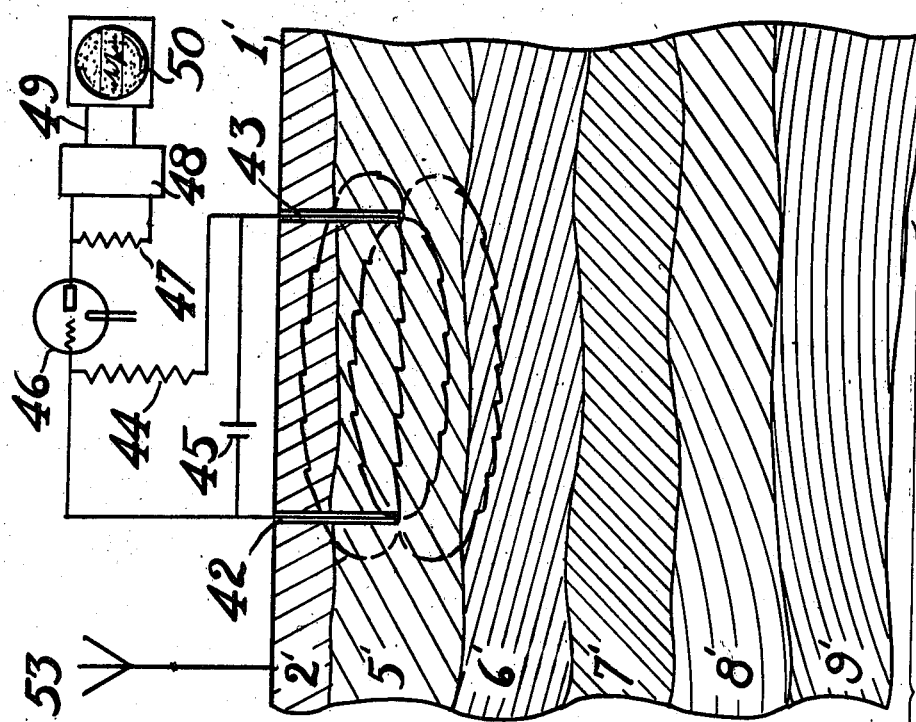
Fig. 4 is a vertical sectional view through the earth strata showing still another modified form of the applicant's invention.
Figure 4:
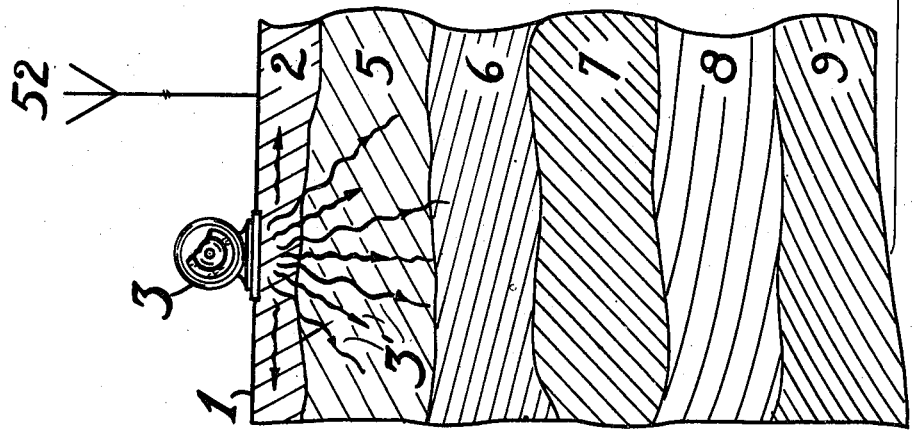

Referring to Fig. 4, a modified form of electric circuit for connecting the electrodes is illustrated. In this form of the invention the electrodes designated 42 and 43 may be located either in the surface stratum 2, 2' or in one of the sub-surface strata. Across the electrodes 42 and 43 there is connected a high resistance 44 in parallel with a battery 45. The high resistance 44 serves as a grid leak of a vacuum tube 46, which may be a three-electrode tube, as shown, or a multiple grid tube. Across the plate resistance 47 of this vacuum tube 46 an amplifier 48 is connected, the output wires 49 of which lead to an oscillograph 50. Numerals 52 and 53 designate antennas for wireless communication between source 3 of earth vibrations and the observing point.

The waves which have penetrated the deeper earth strata 5, 6, 7, 8 and 9 and have been refracted or reflected arrive in the region traversed by the current from the battery or from the alternating current generator with amplitudes depending upon the distance which they have traveled and in different phases. The resultant of the waves is recorded by the oscillograph. By observing at different distances from the source 3 it is found that the amplitude of the recorded vibration varies with the distance, increasing for some distance, then decreasing, then increasing again, etc. The observed frequency, however, is always five cycles or whatever other frequency may be used. This is evident from the following: Assume that some wave $W_1$ arrives with amplitude $A_1$, and phase angle $\alpha_1$, the amplitude and phase angle of wave $W_2$ are $A_2$ and $\alpha_2$, respectively, of wave $W_3$, $A_3$ and $\alpha_3$ and so on. The frequency employed is $$\frac{W}{2\pi}$$

Then the observed amplitude is (1) $y = A_1 \sin(wt+\alpha_1) + A_2 \sin(wt+\alpha_2) + A_3 \sin(wt+\alpha_3) + + A_n \sin(wt+\alpha_n)$ where $t$ is the time.

This can be written in the form (2) $\qquad y = C \sin wt + D \cos wt$ where (3) $C = A_1 \cos\alpha_1 + A_2 \cos\alpha_2 + A_3 \cos\alpha_3 + A_n \cos\alpha_n$ and (4) $D = A_1 \sin\alpha_1 + A_2 \sin\alpha_2 + A_3 \sin\alpha_3 + A_n \sin\alpha_n$ Equation 2 can be written (5) $\qquad y = E \sin(wt+B)$ where $$E = \sqrt{C^2+D^2} \text{ and } B = \tan^{-1}\frac{D}{C}$$

It is seen, therefore, that the observed frequency is $$\frac{W}{2\pi}$$

while the amplitude $E$ and the phase angle $B$ of the observed phenomenon depend on the amplitudes and phase angles of the waves arriving from the source 3. It is advantageous to use two or more different frequencies at each point of observeration, the frequencies being integral multiples of each other. Thus one can use 5 cycles, 10 cycles and 15 cycles at each point of observation. The lowest frequency being $$\frac{W}{2\pi}$$

one obtains then the three equations (6) $\quad\begin{aligned}y_1 &= E_1 \sin(wt+B_1) \\ y_2 &= E_2 \sin(2wt+B_2) \\ y_3 &= E_3 \sin(3wt+B_3)\end{aligned}$ Now the phase angles $B_1$, $B_2$ and $B_3$ can be determined easily by communicating the oscillations of source 3 to the observing point and recording them by means of the oscillograph. Communication can be accomplished by means of wireless, telegraph, or other means which will readily suggest themselves to those familiar with the art. The amplitudes are, of course, read directly from the record. Having determined $E$ and $B$ from the records as explained, the relative amplitude $A_n$ and the relative phase angle $\alpha_n$ of each wave can be calculated.

Figure 5:
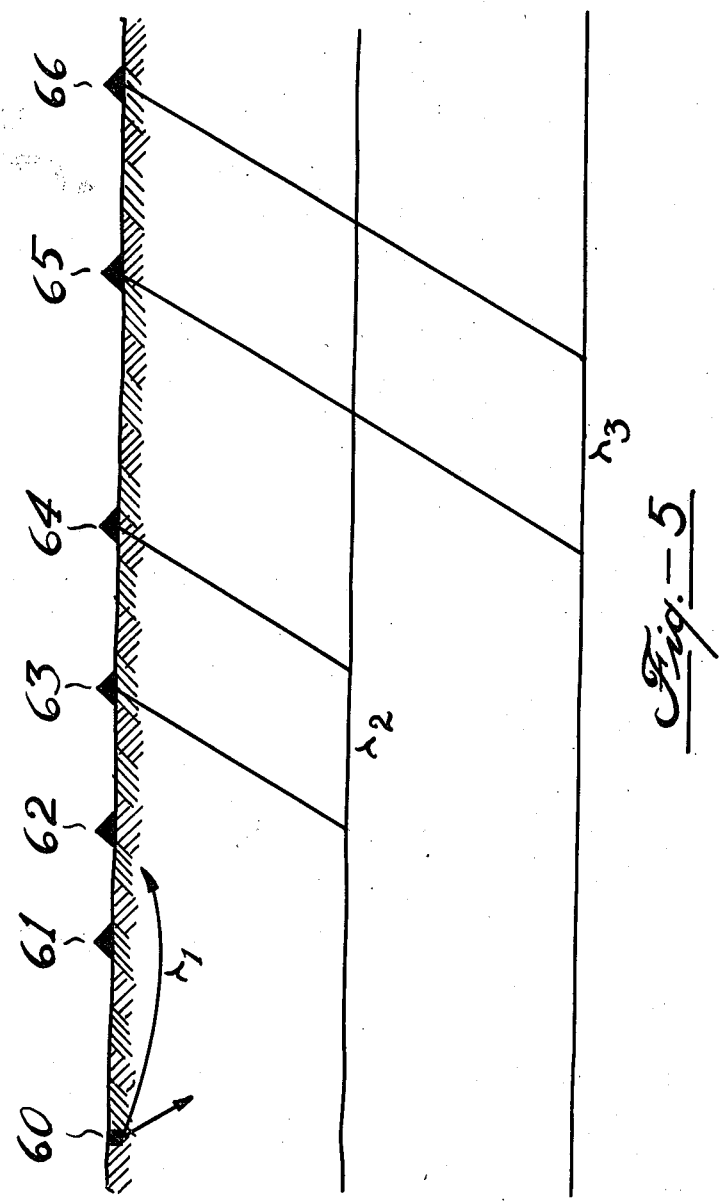
Fig. 5 is a vertical sectional view through the earth strata showing diagrammatically their arrangement for carrying out the invention.

Referring to Figure 5, reference numeral 60 designates the source of vibrations of a given frequency while points 61 to 66 inclusive designate observation points with the electrodes 18 and 19 of Figure 1, 35 and 36 of Figure 3 or 42 and 43 of Figure 4 set up at each of the locations 61 to 66 inclusive. In practice, an observation of the amplitude and of the phase angle is made at observation point 61. Moving out away from 61 in the direction of observation point 62 it is found that the phase angle changes, and a point 62 is found at which the phase angle is the same as at observation point 61. Then we know that there is one wavelength, $\lambda_1$, between observation points 61 and 62. Multiplying the wavelength $\lambda_1$, or the distance between observation points 61 and 62, by the frequency which was used in making this observation, we obtain the velocity $V_1$ in the first layer. If we now double the frequency we shall find a point of observation midway between points 61 and 62 at which the phase angle is the same as at observation points 61 and 62, so that we have two wavelengths between observation points 61 and 62, hence the wavelength is one-half of $\lambda_1$ but the frequency is twice so that the velocity $V_1$ should come out the same as before by these two independent measurements. Proceeding on out from observation point 62 we locate another point 63 and another point 64 such that the phase angle is the same at the two points 63 and 64, which means that there is one wavelength $\lambda_2$ between points 63 and 64. If now $\lambda_2$ is different from $\lambda_1$ it means that the wave is coming from a lower layer, and multiplying $\lambda_2$ by the frequency used we obtain $V_2$, the velocity in the second layer. This value of $V_2$ is again checked by using different frequencies and determining different wave lengths. Proceeding out away from point 64 we locate observation points 65 and 66 at which the phase angle is the same, the distance between the points 65 and 66 being different from the distance between points 63 and 64. Multiplying this distance between the observation points 65 and 66 which is one wavelength $\lambda_3$ by the frequency used, we obtain the velocity $V_3$ in the third layer.

The amplitudes of the waves are dependent upon the depths to which they have penetrated. The method offers, therefore, simple and convenient means for determining the relative depths of sub-surface strata.

Another advantage inherent in this method is the high sensitivity of the amplifying and recording means which can be employed. In the conventional refraction and reflection shooting by means of impulses it is necessary to lower the sensitivity of the observing means until the natural ground unrest is not recorded and to shoot sufficient dynamite to increase the amplitude of the impulse arriving at the point of observation until it exceeds the amplitude of the natural ground unrest. Another disadvantage of the conventional types of shooting by impulses resides in the necessity of using highly damped filtering, amplifying and recording means with consequent high losses. By the present method it becomes advantageous to use undamped amplifiers and recorders, tuned sharply to the frequency of source 3 which is being used. The use of a single frequency at any one time in conjunction with undamped and resonant amplifiers and recorders permits of the employment of extremely high sensitivity in the observing means so that a source with relatively low power output can be used.

Various changes may be made within the scope of the appended claims in which it is desired to claim all novelty inherent in the invention as broadly as the prior art permits.

In the appended claims the expression "characteristic of a wave" designates a value which changes in harmony with the wave form. More specifically, this value may be a resistance, inductance or capacity, or a combination thereof, or an electrical force which varies with these values such as a voltage or a current.

I claim:

1. The method of ascertaining anomalies in the earth's substructure which comprises applying periodic impulses to the earth at a given point, thereby sending waves through the ground, receiving the waves from the ground at a point removed from the sending point, recording a phase characteristic of said received waves at said receiving point, independently recording, at said receiving point, a phase characteristic of additional waves having a constant phase relation with the applied impulses and observing the phase relation between the received waves and said additional waves.

2. In a system of geophysical exploration of superimposed earth strata through which the velocity of seismic waves increases with increasing depth, means for continuously creating waves in the earth of a given frequency to yield waves in the surface stratum of a pre-determined wave length and waves in the lower strata of longer wave length, spaced electrodes in the earth substantially aligned with the source of waves and separated a distance equal to an integral number of wave lengths of the waves in the surface stratum, means for passing an electric current through the earth between the electrodes creating a volume of earth the resistance of which varies in response to the waves received from the sub-surface strata and is unaffected by the direct waves, and a recorder operatively associated with the last mentioned means whereby the effect of the waves received from the sub-surface is recorded.

3. In a system of geophysical exploration of superimposed earth strata through which the velocity of seismic waves increases below the surface stratum, means for continuously creating waves in the surface stratum of a low frequency to yield waves in the surface stratum of a pre-determined wave length and waves in the lower strata of longer wave length, spaced electrodes in the earth substantially aligned with the source of waves and separated a distance from each other equal to the wave length of the waves in the surface stratum, means for passing an electric current through the earth between the electrodes creating a volume of earth the resistance of which varies in response to the waves received from sub-surface strata and is unaffected by the direct waves, and means for recording the variation in resistance.

4. The method of seismic prospecting, which comprises creating periodic waves and sending them into the ground, receiving the waves from the ground at a receiving station comprising an electrical circuit of which a portion of the earth is a part whereby the arrival of the waves may be detected by their effect on a parameter of the circuit, transmitting the excited waves directly to the receiving station, and independently recording the two sets of waves whereby the phase relation between the seismic waves and waves as initially created can be established.

5. The method of ascertaining anomalies in the earth's substructure, which comprises creating periodic waves and sending them through the ground at a given point, receiving the waves from the ground at a point removed from the sending point, recording at said receiving point a characteristic of mainly those waves which arrive at said receiving point by reflection from sub-strata, independently recording at said receiving point a characteristic indicative of the waves at the sending point and observing the phase relation between the created waves and reflected waves.

6. The method of ascertaining anomalies in the earth's substructure, which comprises creating periodic waves, sending them through the ground at a given point, establishing an electric circuit in an area removed from the sending point by arranging electrically connected electrodes in substantial alignment radially with the sending point and spaced from each other a distance which is substantially equally divisible by the length of a surface wave emanating from said sending point, receiving waves from the ground in the area between said electrodes, recording in said circuit a characteristic of the waves so received, independently recording at said receiving point a characteristic of the waves at the sending point and observing the phase relation between the created waves and the received waves.

7. The method of ascertaining anomalies in the earth's substructure, which comprises creating periodic waves and sending them through the ground at a given point, receiving the waves from the ground at a point removed from the sending point, recording at said receiving point a characteristic of mainly those waves which arrive at said receiving point by reflection from sub-strata, simultaneously and independently recording at said receiving point a characteristic of the waves at the sending point and observing the phase relation between the created waves and reflected waves.

8. The method of ascertaining anomalies in the earth's sub-structure, which comprises creating periodic waves of a given frequency and sending them through the ground at a given point, receiving the waves from the ground at a point removed from the sending point, recording at said receiving point a characteristic of mainly those waves which arrive at said receiving point by reflection from sub-strata, independently recording at said receiving point a characteristic of the waves at the sending point, observing the phase relation between the created waves and reflected waves of the frequency employed, then changing the frequency of the created waves and repeating the recording operations to observe the phase relation between the created waves and reflected waves at the new frequency.

9. The method of ascertaining anomalies in the earth's substructure, which comprises creating periodic waves of a given frequency and sending them through the ground at a given point, receiving the waves from the ground at a point removed from the sending point, recording at said receiving point a characteristic of mainly those waves which arrive at said receiving point by reflection from sub-strata, simultaneously and independently recording at said receiving point a characteristic of the waves at the sending point, observing the phase relation between the created waves and reflected waves, changing the frequency of the created waves to a frequency which is a multiple of that first employed and repeating the recording operations to observe the phase relation between reflected waves and created waves of the changed frequency.

10. The method of ascertaining anomalies in the earth's substructure in an area having a surface layer through which waves travel with a low velocity and sub-surface layers through which waves move with a higher velocity, which comprises creating periodic waves and sending them through the ground at a given point, receiving the waves from the ground in an area removed from the sending point and at a level below the surface layer, recording at said receiving area a characteristic of mainly those waves which arrive at said receiving area by reflection from sub-strata, simultaneously and independently recording at said receiving area a characteristic of the waves at the sending point and observing the phase relation between the created waves and reflected waves.

LUDWIG W. BLAU.